United States Patent [19]

Hickman et al.

[11] Patent Number: 4,893,796
[45] Date of Patent: Jan. 16, 1990

[54] PENDULUM VIBRATION ISOLATOR AND DAMPER

[75] Inventors: Derek F. Hickman, Chessington; Raymond H. Boshier, Basingstoke, both of England

[73] Assignee: Racal Marine Electronics Limited, United Kingdom

[21] Appl. No.: 250,626
[22] PCT Filed: Jan. 19, 1988
[86] PCT No.: PCT/GB88/00033
 § 371 Date: Oct. 11, 1988
 § 102(e) Date: Oct. 11, 1988
[87] PCT Pub. No.: WO88/05507
 PCT Pub. Date: Jul. 28, 1988

[30] Foreign Application Priority Data

Jan. 27, 1987 [GB] United Kingdom ............... 8701772

[51] Int. Cl.⁴ .................... F16M 1/00; F16M 13/00; F16F 1/00
[52] U.S. Cl. .................................. 261/136; 248/565; 267/150
[58] Field of Search .............................. 188/378–380; 267/34, 136, 150; 248/559, 581, 582, 565

[56] References Cited

U.S. PATENT DOCUMENTS

| 2,335,834 | 11/1943 | Wood | 248/565 |
| 2,941,777 | 6/1960 | Aller | 248/568 |
| 3,348,796 | 10/1967 | Baratoff et al. | 248/565 |

FOREIGN PATENT DOCUMENTS

| 0015118 | 9/1980 | European Pat. Off. | 248/565 |
| 3214687 | 10/1983 | Fed. Rep. of Germany . | |
| 0595337 | 9/1925 | France | 248/559 |
| 2365727 | 4/1978 | France . | |
| 1240974 | 6/1986 | U.S.S.R. | 267/136 |
| 0458342 | 12/1936 | United Kingdom . | |
| 0593912 | 10/1947 | United Kingdom . | |

Primary Examiner—Robert J. Oberleitner
Attorney, Agent, or Firm—Kinney & Lange

[57] ABSTRACT

A vibration isolator comprises a helical spring support between a base 3 and a cap 8 from which depends a pendulum rod 14 carrying at its lower end a ball joint 16. A pneumatic damper in the form of a piston 24 forms a gas compression chamber with the cap 8. A friction disc 22 encircles the pendulum rod 14. The natural resonant frequencies of the spring 11 and the pendulum may be selected to be very low, such as 4 to 5 Hertz.

9 Claims, 1 Drawing Sheet

U.S. Patent
Jan. 16, 1990
4,893,796
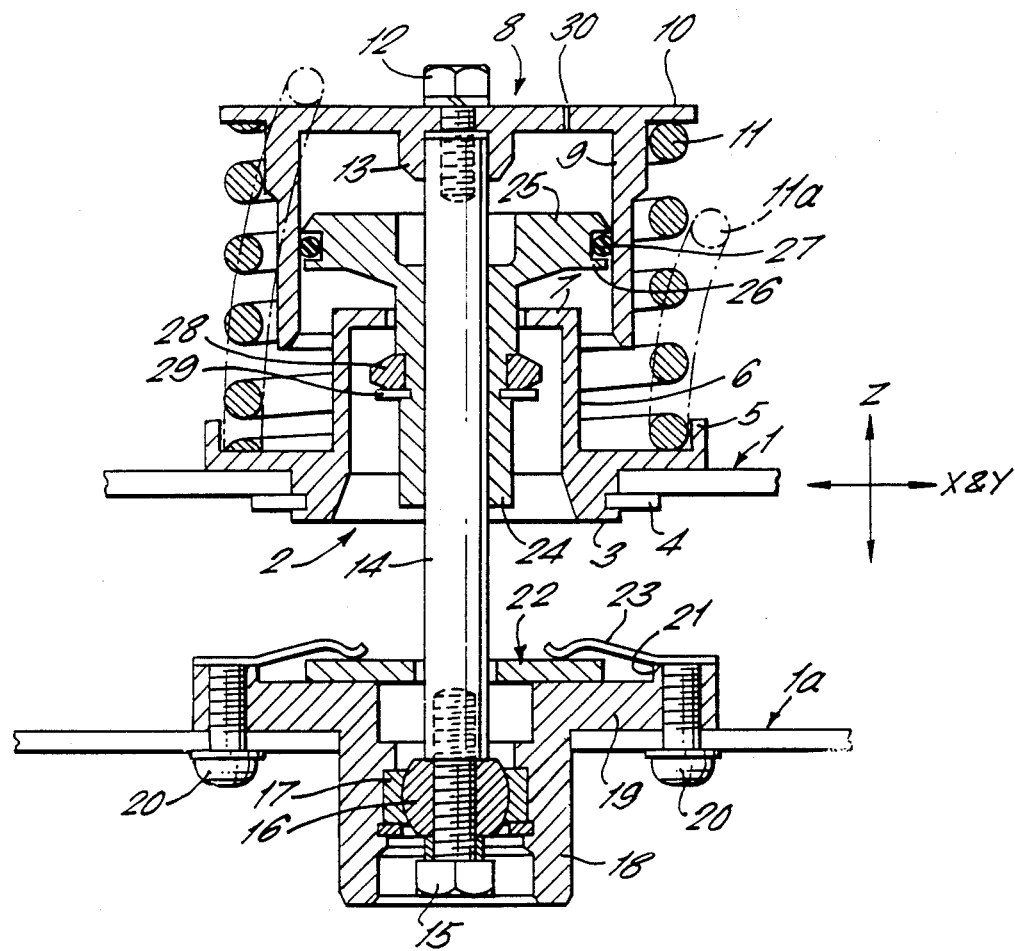

PENDULUM VIBRATION ISOLATOR AND DAMPER

This invention relates to vibration isolators. The invention is particularly concerned with a vibration isolator which may be used, preferably in an appropriate plurality, to support electrical or electronic equipment, such as a television display tube, relative to a frame or other member which is subject to vibration so that corresponding vibration of the equipment is at least substantially reduced. However the isolator is intended to have a more general utility in other contexts where transmission of vibration is to be substantially reduced.

It is generally known to provide anti-vibration couplings, normally comprising a foot which can be secured to equipment requiring isolation from vibrations and includes elastomeric material. such isolators are not particularly efficacious particularly at local frequencies for example in the range of 5 to 50 Hertz. It is the general object of the invention to provide an improved isolator and it is a particular object of the invention to provide an isolator which can provide attenuation of vibrations at low frequencies which may affect the stability of a display produced by a television or other display tube used in a sea going vessel.

The present invention generally comprises an assembly including a pendulum which is mounted relative to a base by a spring support that provides resilience lengthwise of the pendulum and which allows the pendulum to execute swinging movement, the pendulum having remote from the end supported by the spring a pivoted coupling. The base may be attached to or form part of a structure which is subject to vibration and the pivoted coupling may be connected to the equipment or other assembly which is to be isolated from vibration. Very preferably the assembly includes a pneumatic damper which may take the form of a piston mounted for sliding movement relative to the pendulum and disposed to form a pneumatic chamber with the pendulum assembly.

Preferably the spring support is constituted by a helical spring disposed between a base member and part of the pendulum assembly, the pendulum being arranged to pivot about a point within the ambit of the spring. The aforementioned coupling may comprise a ball joint which is adapted for connection to the equipment to be isolated.

BRIEF DESCRIPTION OF THE DRAWING

FIG. 1 illustrates in slightly simplified form one embodiment of a vibration isolator according to the invention.

DETAILED DESCRIPTION OF THE PREFERRED EMBODIMENT the embodiment shown by way of example in FIG. 1 is intended for securing to a frame or support 1 which may be subject to vibration which for the purpose of discussion may be resolved into vibration in three axes, the X and Y axes being in the horizontal plane (as shown in the Figure) and the Z axis being vertical. however the embodiment may accommodate tilting of, for example, about 10° from the normal to the plane of the member 1 representing the supporting structure.

The isolator includes a base member 3 which may be, as shown in the Figure, adapted for reception in an aperture 2 in the structure 1, the base member 3 being of generally circular form being retained by a circular clip 4 within the aforementioned aperture and having an outer upturned lip 5 and an inner tubular part 6 terminating at its upper end in an inwardly turned rim 7.

A major component of the isolator is a pendulum assembly one end of which is constituted by a cap 8 having a cylindrical wall 9 extending axially of the assembly and an outwardly extending rim 10 forming a shoulder with the wall 9. A spring support is disposed between the base member 3 and one end of the pendulum assembly and in this embodiment the spring support is constituted by a helical spring 11 engaging the aforementioned shoulder of the cap 8 and retained at its lower end within the upturned rim 5 of the base 3.

Secured by a bolt 12 within a bush 13 disposed centrally of the cap 8 is a tie rod 14 which constitutes the main part of the pendulum assembly. At the other end of the tie rod is a pivoted coupling, in this embodiment in the form of a ball joint: a bolt 15 secures a ball 16 to the lower end of the tie rod, the ball being received in a complementary bearing block 17 secured within a tubular housing 18 which has at its upper end an outwardly radially extending flange 19. The flange may be secured to the equipment which is to be isolated, represented by the panel 1a, by means of a bolt 20. The flange 19 has an outer rim 21 within which is a friction disc 22 which is movable over the top surface of the flange and may be retained on the top surface of the flange 19 by means of a cantilever leaf spring 23 secured in any convenient manner to the rim 21.

There may be a clearance of, in this embodiment, about 1.6 mm between the inner periphery of the friction disc 22 and the tie rod 14.

A pneumatic damper in the form of an air cushion is provided by means of a free piston 24 which is carried by the pendulum assembly and forms a damping chamber therewith. In particular, the piston 24 is slidable on the tie rod 14 and has a head 25 which is disposed within the cylindrical wall 9, the outer periphery of the head including a recess 26 retaining an O-ring 27 in contact with the inner face of the wall 9.

The inwardly turned rim 7 is positioned below the head 25, and will engage the head when the pendulum assembly and piston head move downwardly through a certain distance, so that further downward movement of the pendulum will result in relative movement between the piston head 25 and cylindrical wall 9. A retainer ring 28 is held in place with a snap ring 29 and provides an abutment that will engage the rim 7 if the pendulum and piston 24 move upwardly a sufficient amount, further upward movement of the pendulum then causing relative movement between the piston head and cylindrical wall 9.

In this embodiment there may be a clearance between the inner periphery of the rim 7 of the base 3 and the outside of the stem of the piston 24 of a fraction (e.g. about 40%) of the aforementioned clearance between the friction disc 22 and the tie rod 14.

An isolator such as is shown in the drawing may be used in a set of three or four or more to support equipment on a frame (as represented by the member 1a) with respect to a structure as represented by the member 1. For example, there may be two pairs of isolators, the members of each pair supporting a respective end of a respective one of two beams on which the equipment is mounted. Although the tie rod is intended to be in a vertical axis, the aforementioned beams need not be in the same horizontal plane; they may be vertically offset, and the tilting of the pendulum assembly relative to the base 3 may be accommodated by lateral flexure of the helical spring 11 so that it takes up the form shown in the outline 11a.

It is generally desirable, and made possible by the present invention, to select the natural resonant frequency of the pendulum assembly and that of the spring support 11 to be approximately equal and to be quite low, such as in the region of 4 or 5 Hertz in the particular example under discussion. The spring 11 must be robust enough to support the loading imposed by its share of the weight of the equipment on the frame 1a; nevertheless the criteria of resonant frequency and robustness are readily fulfilled in normal circumstances.

In the assembly shown in the Figure, the pendulum assembly tends to rotate about a point which is within and disposed near the top of the helical spring 11.

Vibration of the structure 1 in the X and Y directions is substantially attenuated by the pendulum assembly for frequencies above the resonant frequency thereof. Vibration in the Z or vertical direction is partly attenuated for frequencies above the natural resonant frequency of the spring support and is further attenuated by the damper constituted by the piston 24. As the pendulum assembly moves downwardly, the piston 24 will tend to move upwardly relative to the tie rod 14, but after the rim 7 engages the head 25, the movement is damped owing to the air chamber formed between the head of the piston and the cap 8. A flow restrictor in the form of a small orifice 30 in the cap provides a slow flow of the air to and from the chamber.

Then pendulum is unaffected by the damping provided by the friction disc unless the amplitude of vibration of the pendulum is sufficiently large or the tilt angle of the pendulum is substantive. The friction disc tends to recentre itself around the pendulum. The two damping systems are independent while the device is under normal isolating conditions, i.e. at any frequency other than the resonant frequency.

We claim:

1. A vibration isolator and damper comprising a base (3), a pendulum assembly (8,14), a spring support (11) which supports one end of the pendulum assembly with respect to the base and provides resilience lengthwise of the assembly while allowing swinging movement of the pendulum assembly, a pivoted coupling means (16,17) provided at the other end of the pendulum assembly, first and second damping means (9,25,22) and first and second means for coupling (7, 28, 19, 23) the first and second damping means to the pendulum assembly for damping lengthwise and swinging movement of the pendulum assembly only after a predetermined amount of respective lengthwise and swinging movement of the pendulum assembly while supported by the spring support.

2. A vibration isolator and damper according to claim 1 in which the spring support (11) comprises a helical spring.

3. A vibration isolator and damper according to claim 2 in which the pendulum assembly includes a pendulum member (14) extending substantially axially of the helical spring.

4. A vibration isolator and damper according to claim 1 in which the pivoted coupling means (16,17) comprises a ball joint.

5. A vibration isolator and damper according to claim 1 in which the damping means comprises a free piston (25) forming an air cushion with the pendulum assembly, for damping lengthwise movement of the pendulum assembly, the pendulum assembly including a cap (8) having a depending wall (9) within which said piston (25) is disposed to form said air cushion.

6. A vibration isolator and damper according to claim 5 in which the piston (25) is slidably mounted on the pendulum assembly (14).

7. A vibration isolator and damper according to claim 1 in which the said second means for damping comprises a friction member encircling and spaced from a part of the pendulum assembly, the friction member being disposed on a part which is connected to the pendulum assembly by way of the coupling means.

8. A vibration isolator and damper comprising a base (3), a pendulum assembly (8,14), a spring support (11) which supports one end of the pendulum assembly with respect to the base and provides resilience lengthwise of the assembly while allowing swinging movement of the pendulum assembly, a pivoted coupling means (16,17) provided at the other end of the pendulum assembly and damping means (9,25) comprising a free piston (25) forming an air cushion with the pendulum assembly, for damping lengthwise movement of the pendulum assembly, the pendulum assembly including a cap (8) having a depending wall (9) within which said piston (25) is disposed to form said air cushion.

9. A vibration isolator and damper comprising a base (3), a pendulum assembly (8,14), a spring support (11) which supports one end of the pendulum assembly with respect to the base, said pendulum assembly having an elongated member having a central axis, said spring permitting resilient movement of the pendulum assembly axially, and permitting said elongated member to swing so that an opposite end of the pendulum assembly from the one end can move laterally to the longitudinal axis, means pivotally coupling a load to be isolated from vibrations to the opposite end of the pendulum assembly, first damping means for damping lengthwise movement of the pendulum assembly after the spring is resiliently yielded by a predetermined lengthwise amplitude, and second means for damping swinging movement of said pendulum assembly as supported on said spring after the swinging movement has reached a preselected amplitude.

* * * * *